(12) United States Patent
Daroux et al.

(10) Patent No.: US 6,562,511 B2
(45) Date of Patent: May 13, 2003

(54) BATTERY SEPARATOR FOR LI-ION AND/OR LI-ION POLYMER BATTERY

(75) Inventors: Mark L. Daroux, Cleveland Heights, OH (US); Frough K. Shokoohi, Kirtland, OH (US); Geoffrey Barlow, Chagrin Falls, OH (US); Xuekun Xing, Richmond Heights, OH (US)

(73) Assignees: NTK Powerdex, Inc., Wixom, MI (US); NGK Spark Plug Co., Ltd. (JP)

( * ) Notice: Subject to any disclaimer, the term of this patent is extended or adjusted under 35 U.S.C. 154(b) by 0 days.

(21) Appl. No.: 09/730,812

(22) Filed: Dec. 6, 2000

(65) Prior Publication Data
US 2002/0102455 A1 Aug. 1, 2002

Related U.S. Application Data
(60) Provisional application No. 60/169,860, filed on Dec. 9, 1999.

(51) Int. Cl.$^7$ .......................... H01M 2/16; H01M 2/18; H01M 28/14; H01M 6/00
(52) U.S. Cl. ...................... 429/144; 429/129; 429/142; 29/623.3
(58) Field of Search ............................... 429/129, 142, 429/144; 29/623.3

(56) References Cited

U.S. PATENT DOCUMENTS

| | | | | |
|---|---|---|---|---|
| 3,655,449 A | | 4/1972 | Yamamoto et al. | 136/107 |
| 3,953,241 A | * | 4/1976 | Langer et al. | 429/142 |
| 4,650,730 A | * | 3/1987 | Lundquist et al. | 429/245 |
| 4,888,256 A | | 12/1989 | Zuckerbrod | 429/144 |
| 5,376,477 A | | 12/1994 | Aidman et al. | 429/141 |
| 5,441,824 A | | 8/1995 | Rippel | 429/53 |
| 5,453,333 A | | 9/1995 | Takauchi et al. | 429/62 |
| 5,691,047 A | | 11/1997 | Kurauchi et al. | 428/315.7 |
| 5,691,077 A | | 11/1997 | Yu | 429/62 |
| 5,952,120 A | | 9/1999 | Yu et al. | 429/144 |
| 5,981,107 A | | 11/1999 | Hamano et al. | 429/231.95 |
| 5,993,999 A | | 11/1999 | Rivers et al. | 429/244 |
| 6,080,507 A | | 6/2000 | Yu | 429/62 |
| 6,136,471 A | | 10/2000 | Yoshida et al. | 429/218.1 |

* cited by examiner

Primary Examiner—Stephen Kalafut
Assistant Examiner—Julian Mercado
(74) Attorney, Agent, or Firm—Mark Kusner; Michael A. Jaffe

(57) ABSTRACT

A separator for a Li-ion polymer battery comprised of a plurality of separator layers that are laminated together. The plurality of separator layers including a first layer formed of a first separator material, and a second layer formed of a second separator material, wherein the second layer is compositionally and structurally different from the first layer.

8 Claims, 7 Drawing Sheets 2,000X 2,000X

BATTERY SEPARATOR FOR LI-ION AND/OR LI-ION POLYMER BATTERY

This application claims the benefit of Provisional application Ser. No. 60/169,860, filed Dec. 9, 1999.

FIELD OF THE INVENTION

The present invention relates generally to batteries, fuel cells and electrochemical cells, and more particularly to separators used in such devices. The invention is particularly applicable to lithium-ion polymer batteries and will be described with respect thereto. It will be appreciated, however, that the present invention finds advantageous applications in other devices, such as those indicated above.

BACKGROUND OF THE INVENTION

Most batteries include a component referred to as a "separator" that is adapted to separate, and prevent direct contact between, an anode section and a cathode section. In addition to maintaining physical separation of the anode section and the cathode section, a separator is designed to perform several other functions such as forming an ionic pathway between the anode section and cathode section, electronic insulation, mechanical support and as a layer binding the anode section and cathode section. Each of these requirements often dictates the need for different and sometimes opposite material properties. For example, a material having high tensile strength may have poor flexing properties, or a material having a high porosity may have poor adhesive properties. Thus, the design and manufacture of a separator for use in a battery requires a balancing of a number of material properties such as mechanical strength, adhesion, porosity and processability.

The present invention provides a multi-layered separator component for use in an electromechanical device, where the multi-layered separator has at least two layers formed of different separator materials and wherein each layer has different physical properties than the other.

SUMMARY OF THE INVENTION

In accordance with a preferred embodiment of the present invention, there is provided a separator for a lithium-ion polymer battery that is comprised of a plurality of separator layers that are laminated together. The plurality of separator layers includes a first layer formed of a first separator material and a second layer formed of a second separator material, wherein the second layer is structurally and compositionally different from the first layer.

In accordance with another aspect of the present invention, there is provided a Li-ion and/or Li-ion polymer cell that is comprised of a cathode section, an anode section and a multi-layered separator disposed between the anode section and the cathode section. The multi-layered separator includes a first layer formed of a first separator material and a second layer formed of a second separator material, wherein the first layer has different physical properties than the second layer.

In accordance with another aspect of the present invention, there is provided a method of forming a Li-ion or Li-ion polymer battery having a multi-layered separator, comprising the steps of:

a) forming an anode section and a cathode section, the anode section having an anode layer adhered to an anode current collector layer and the cathode section having a cathode layer applied to a cathode current collector;

b) laminating a first separator layer formed of a first separator material to the anode layer of the anode section and laminating a second separator layer formed of a second separator material to the cathode layer of the cathode section, wherein the first separator layer is compositionally and structurally different than the second separator layer;

c) laminating the anode section to the cathode section wherein the first separator layer and the second separator layer are disposed between the anode section and the cathode section.

It is an object of the present invention to provide a separator component for an electromechanical device.

It is another object of the present invention to provide a separator component as described above, wherein the separator component is comprised of multiple layers, wherein each layer is formed of a different separator material having different physical and/or chemical properties.

Another object of the present invention is to provide a Li-ion and/or Li-ion polymer cell having a multi-layered separator as described above.

A still further object of the present invention is to provide a method of forming a multi-layered separator as part of a Li-ion and/or Li-ion polymer cell.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
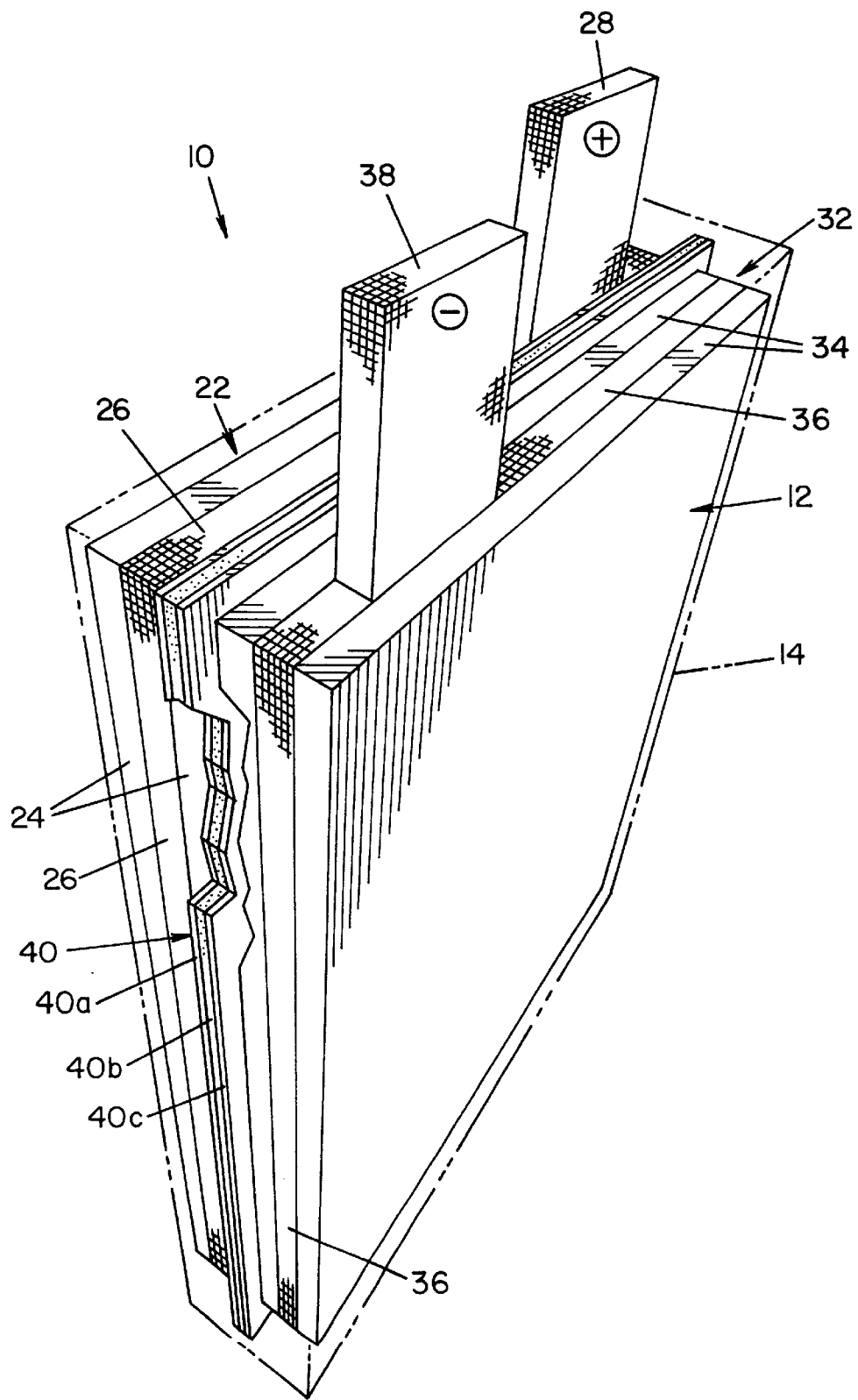
FIG. 1 is a perspective view of a battery cell having a multi-layered separator, illustrating a preferred embodiment of the present invention.
Figure 2:
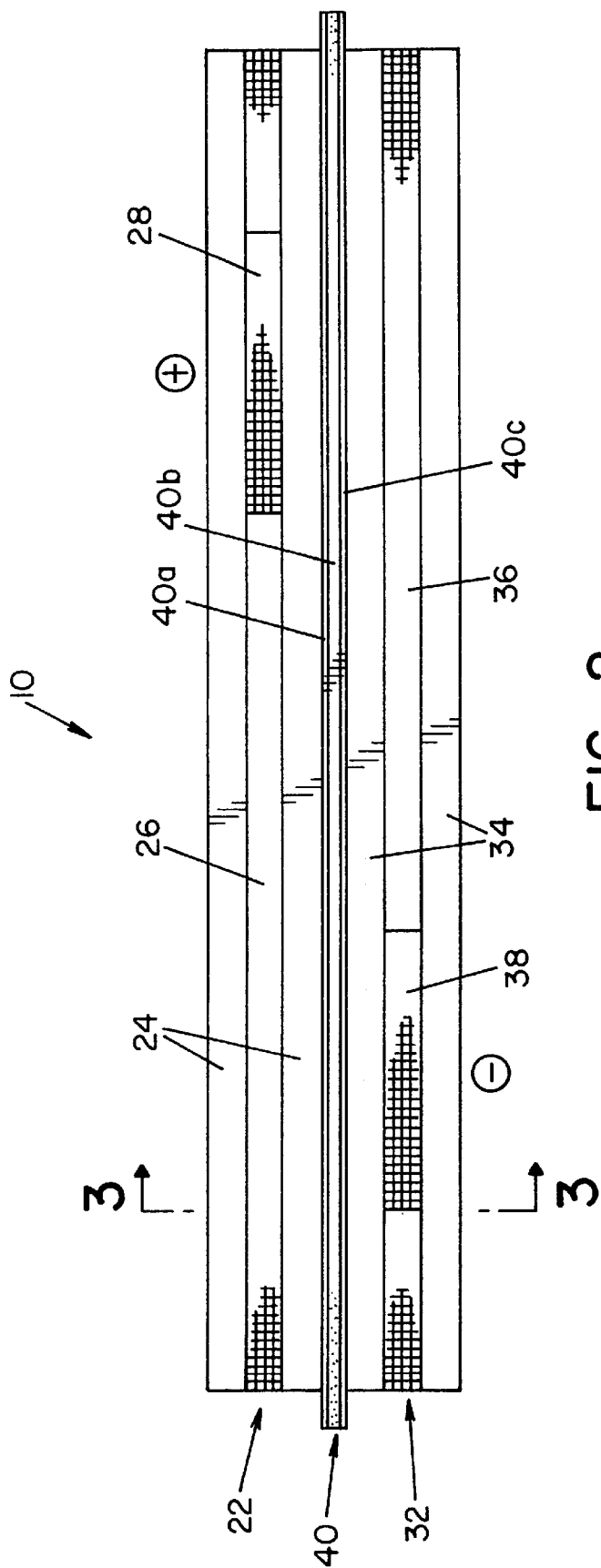
FIG. 2 is an enlarged, top view of the battery cell shown in FIG. 1.
Figure 3:
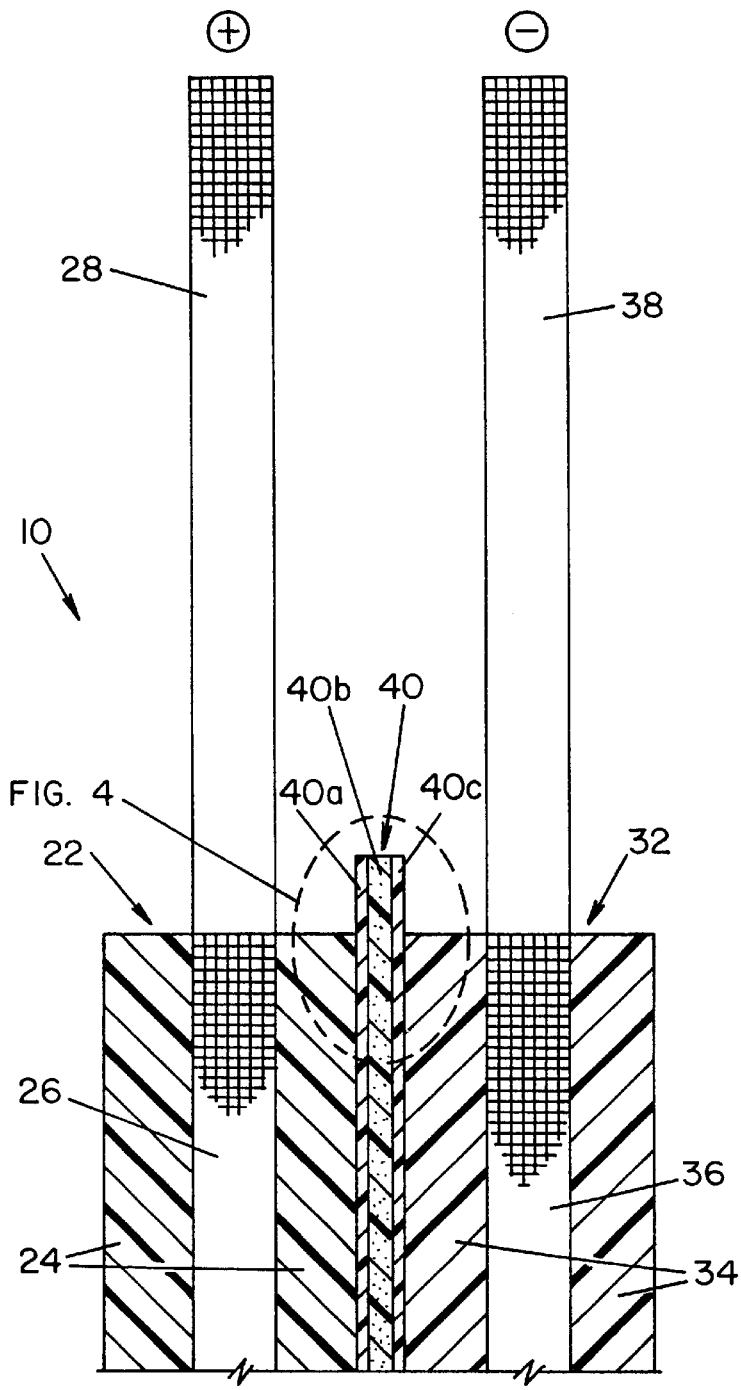
FIG. 3 is a sectional view taken along lines 3—3 of FIG. 2 showing the upper end of the battery cell shown in FIG. 1.
Figure 4:
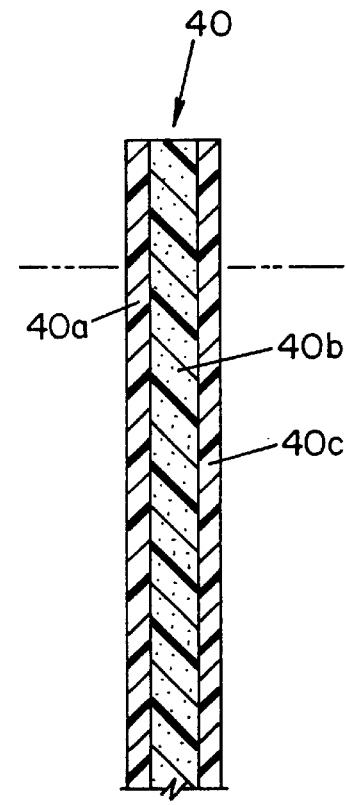
FIG. 4 is an enlarged view of area 4—4 in FIG. 3.

Referring now to the drawings wherein the showings are for the purpose of illustrating a preferred embodiment of the invention only, and not for the purpose of limiting same, FIG. 1 shows a battery 10 illustrating a preferred embodiment of the present invention. Battery 10 is formed of a polymer, electrolytic cell 12 contained within a package 14 (shown in phantom in the drawings) that is formed of a flexible laminate material. Cell 12 is preferably a lithium-based electrochemical cell. Cell 12 may be a primary (non-rechargeable) cell or a secondary (rechargeable) cell. Cell 12 is comprised of a cathode section 22 and an anode section 32.

Figure 5:
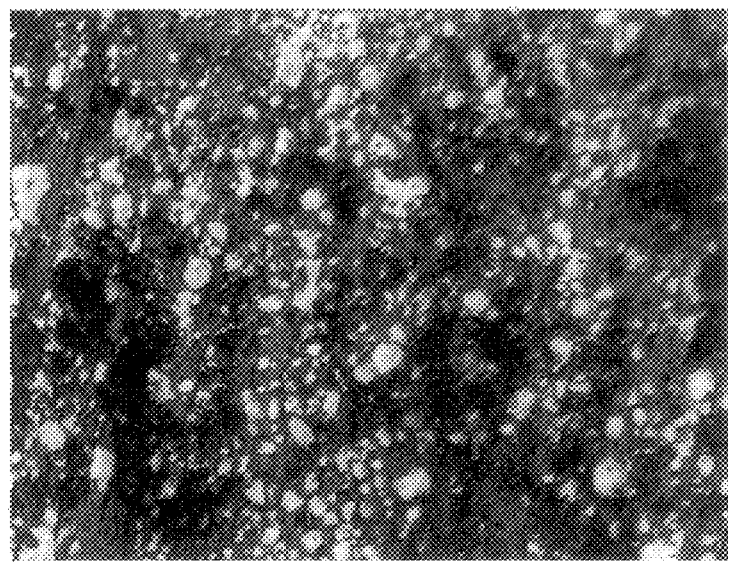
FIG. 5 is a micrograph at 2,000× magnification showing the structure of a cathode.

Cathode section 22 is comprised of two layers 24 of a cathode film. The film-forming cathode layer 24 is preferably comprised of a lithiated metal oxide active material, a conductive material and a binder material. A current collector 26 formed of a metal screen, metal mesh or a sheet of perforated metal is provided between cathode layers 24. Current collector 26 preferably has a thickness of about 25 $\mu$m to about 50 $\mu$m. Current collector 26 includes an outward extending tab or strip 28. Each cathode layer 24 preferably has a thickness of about 50 $\mu$m to about 200 $\mu$m, and more preferably about 80 $\mu$m to about 150 $\mu$m. FIG. 5 is a sectional view of cathode film layer 24 at 2,000× magnification showing lithiated metal oxide particles and conductive particles (the lighter areas) in a binder matrix (the darker background).

Figure 6:
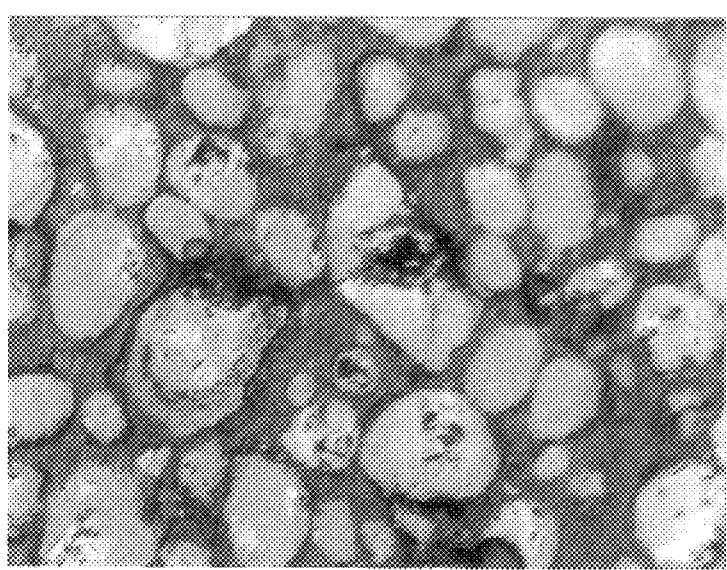
FIG. 6 is a micrograph at 2,000× magnification showing the structure of an anode.

Anode section 32 is comprised of two layers 34 of an anode film having a current collector 36 disposed therebetween. Current collector 36 is preferably formed of a metal mesh, metal screen or a sheet of perforated metal having a thickness of about 25 $\mu$m to about 50 $\mu$m. The film-forming anode layers 34 are preferably comprised of a carbon active material, a conductive material and a binder material. Current collector 36 includes an outward extending tab or strip 38 that defines the negative lead of battery 10. Each anode layer 34 preferably has a thickness of about 50 $\mu$m to about 200 $\mu$m, and more preferably about 80 $\mu$m to about 150 $\mu$m. FIG. 6 is a sectional view of anode film layer 34 at 2,000× magnification showing the carbon active material (the larger, light areas) in a binder matrix (the darker background area).

Between anode section 32 and cathode section 22, a separator 40 is disposed. In accordance with the present invention, separator 40 is a multi-layered, laminated structure having two or more separator layers, designated 40a, 40b and 40c in the drawings. In the embodiment shown, separator 40 is comprised of a first separator layer 40a, a second separator layer 40b and a third separator layer 40c. The overall thickness of cell 12 is about 800 $\mu$m or less, and preferably about 500 $\mu$m or less.

Each layer 40a, 40b and 40c is formed of a separator material. Such material may include, by way of example and not limitation, the following: a polymer, a plasticizer and a filler. The separator material forming a particular separator layer 40a, 40b and 40c is selected to provide such layer with specific physical and structural properties.

Each separator layer is preferably formed of a specific, and different, separator material. As used herein, the term "separator material" refers to materials suitable for forming a separator layer. In the context of the present invention, two separator layers are considered to be formed from "different separator materials" if they are formed of different constituent components, or if they are formed from the same constituent components, but such components are present in different weight percentages or ratios. If separator 40 is comprised of three or more separator layers 40a, 40b, 40c etc., two or more of the separator layers may be formed of the same separator material, however, preferably, no two adjacent separator layers are formed of the same separator material.

In the embodiment shown, separator layers 40a, 40c are essentially identical, and are formed of the same separator material. Because layers 40a, 40c abut respective cathode film 24 and anode film 34, they are preferably formed of a separator material that has good adhesive properties. Typically, a separator layer formed of a softer and less porous material provides better adhesive properties.

Each separator layer 40a, 40c preferably has a thickness of about 10 $\mu$m to about 75 $\mu$m, and more preferably about 15 $\mu$m to about 35 $\mu$m.

Layer 40b is preferably formed to be relatively harder and more rigid than separator layers 40a, 40c, so as to provide structural support. As shown in the drawings, separator layer 40b is relatively thicker than separator layers 40a, 40c. Layer 40b preferably has a thickness of about 20 $\mu$m to about 100 $\mu$m, and more preferably about 30 $\mu$m to about 60 $\mu$m.

Layers 40a, 40b and 40c are preferably formed of conventional separator material. A typical formulation for a separator includes a polymer, a filler and a plasticizer pore former (which is later removed). Separator layer 40b may have a filler composition ranging from 22% by weight (the amount typically used in forming conventional separators), to a maximum percentage that can be processed into a polymer. The preferred filler range is about 25% to about 50%, and most preferably 30% to 40% of the separator material. This filler composition may be combined with any combination of polymer, plasticizer, etc. required to give an appropriate combination of properties for a given application (i.e., battery performance). In general, preferred ranges of polymer are from 20% to 40%, and plasticizer from 30% to 50%.

The filler itself may compromise more than one type of material, and again a combination may be chosen to maximize a desired property, e.g., density. In general, the largest average particle diameter chosen will not exceed half the thickness of the layer in which it is incorporated. The preferred filler is silica.

The overall thickness of the separator may vary from less than 10 $\mu$m to 1 mm depending on the device and the application. For the specific example given, a preferred range is 30 to 80 $\mu$m for final thickness of the graded separator.

A separator layer is formed by dissolving a polymer in an appropriate organic solvent (e.g., acetone) followed by thoroughly dispersing the filler in the polymer solution. Once the filler is dispersed in the polymer solution, a plasticizer is added. The slurry so formed is then cast into a thin film on a carrier by conventional film casting techniques. The cast, but slightly poor separator film, may be subsequently densified and laminated using a hot roll laminator to produce a strong, flexible film.

As will be appreciated by those skilled in the art, various materials, compositions and formulas may be used to produce a separator film. By varying the materials and composition, separator films having a wide difference in properties may be formed.

Figure 7:
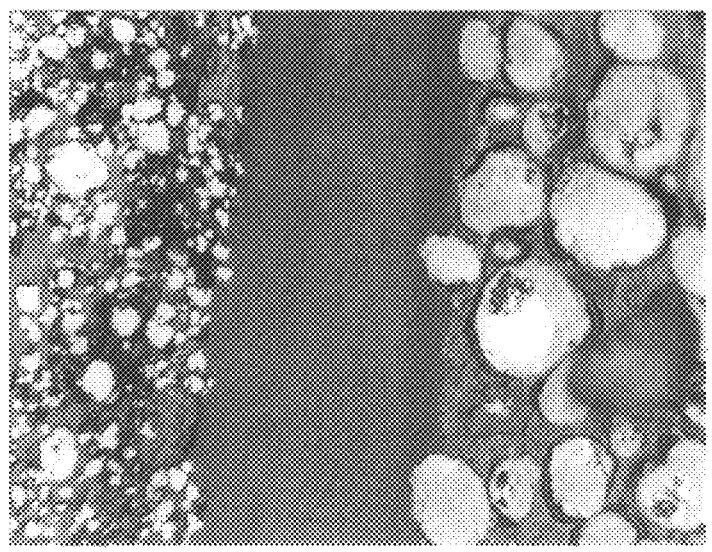
FIG. 7 is a micrograph at 2,000× magnification showing a three-layered separator between a cathode and an anode, according to the present invention.
Figure 8:
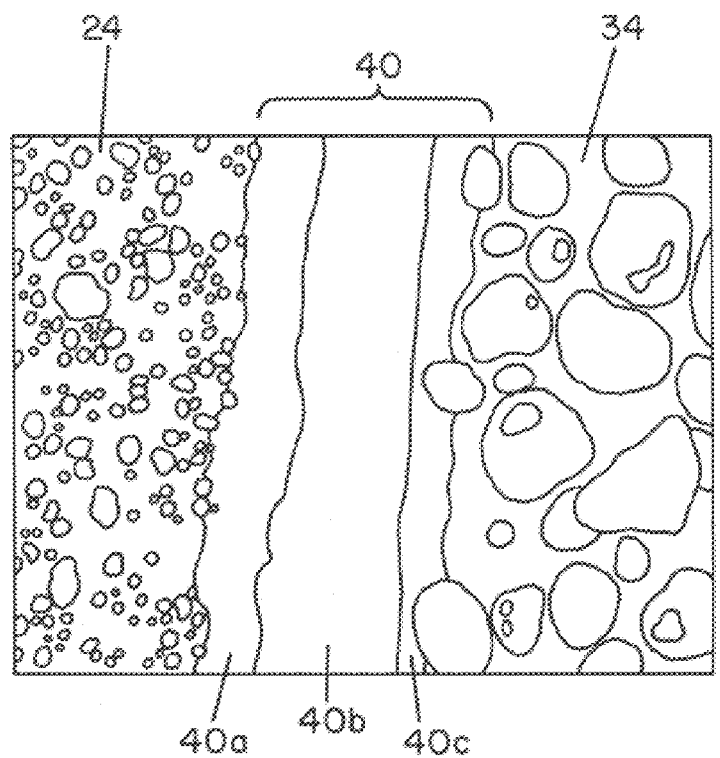
FIG. 8 is a mechanical representation of the three-layered separator shown in FIG. 7.

The present invention provides a multi-layered separator 40 that has at least two separator layers 40a, 40c, each having physical properties and a structural make-up that is different from the other separator layer 40b. FIG. 7 is a sectional view at 2,000× magnification, showing a three-layered separator 40 disposed between a cathode film 24 and an anode film 34. FIG. 8 is a mechanical representation of the image shown in FIG. 7 that is provided for easier identification of the respective layers and components. As shown in FIGS. 7 and 8, separator layers 40a, 40c are relatively thinner as contrasted with intermediate separator layer 40b. As indicated above, layers 40a, 40c are preferably formed of a composition that has low porosity and improved adhesive properties. The improved adhesive properties are particularly important in providing adhesion to anode film layer 34. As seen in FIGS. 7 and 8, the relatively large carbon particles of film 34 produce a rougher exterior surface. A porous, relatively hard separator film would not have good adhesion to such a surface. By providing separator layer 40c that is a relatively soft and less porous material, separator layer 40c can more easily mate with the surface of anode film 34 and provide better adhesion thereto. Similarly, separator layer 40a provides better adhesion to cathode film 24.

The present invention shall now be described by way of the following Example.

EXAMPLE

The following Example relates to the construction of a Li-ion polymer battery using inert matrix technology. In this type of construction, a common polymeric binder, typically a polyvinylidene fluoride (PVDF) co-polymer, is used to form the three basic component layers of the battery, i.e., cathode films 24, anode films 34 and separator 40, i.e., separator layers 40a, 40b and 40c. Separator layers 40a, 40b and 40c are ultimately combined, typically by heat and pressure, into a monolithic porous laminate, into which electrolyte solution can be infused to create a battery. As indicated above, a separator used in such a construction will comprise a polymer (which acts as the binder or matrix), a plasticizer pore former (which is removed later), and a filler. The composition used is chosen to provide a balance of mechanical strength, adhesion, final porosity and processability.

Separator 40 comprises three layers 40a, 40b and 40c. The two outer layers 40a, 40c have the following composition:

| Component | Material | Weight Percentage |
| --- | --- | --- |
| Polymer | Polyvinylidene fluoride | 33.4 |
| Plasticizer | dibutyl phthalate | 44.4 |
| Filler | silica powder (Type I) | 22.2 |

Inner layer 40b differs in that it has a higher proportion of filler. Inner separator layer 40b is prepared with the following composition:

| Component | Material | Weight Percentage |
| --- | --- | --- |
| Polymer | polyvinylidene fluoride | 30 |
| Plasticizer | dibutyl phthalate | 35 |
| Filler | silica powder (Type I) | 22 |
| Filler | silica powder (Type II) | 13 |

The respective separator layers 40a, 40b and 40c are formed from a slurry, as previously described. In this respect, a slurry is prepared by first dissolving the polyvinylidene fluoride polymer in an appropriate organic solvent (e.g., acetone), followed by thoroughly dispersing the silica powder in the polymer solution. Once the silica is dispersed in the polymer solution the plasticizer is added. Then the slurry is cast into a thin film by conventional film casting techniques on a carrier. The cast, but slightly porous separator film, can be subsequently densified and laminated using a hot roll laminator to produce a strong, flexible film.

Separator layers 40a, 40b and 40c are combined, together with cathode and anode sections 22, 32, by a sequence of roll laminations at elevated temperatures and pressures, into a monolithic battery structure.

Separators made from multiple, laminated separator layers 40a, 40b and 40c may vary from 15 $\mu$m and up in thickness and be combined into a final separator 40 with thicknesses ranging from 30 $\mu$m to 100 $\mu$m.

A multi-layer separator 40, as described above, has greater hardness and greater compressive strength than typical, conventional single layer separators. This increases its resistance to penetration and shorting.

In accordance with the present invention, methods and techniques for forming separator 40 are very broad. The different separator layers 40a, 40b and 40c combined into separator 40 may comprise different materials—any effective polymer (including copolymers and blends), filler, plasticizer or pore former including various compositions thereof may be used. Separator layers 40a, 40b and 40c may be combined in a number of ways known to those skilled in the art. These include separate construction of films and their subsequent combination by roll or press lamination, or by adhesive bonding. Alternatively, separator layers 40a, 40b and 40c may be built up by sequential film-forming processes, e.g., by sequential casting, printing, coating or spraying processes, or by some combination of these. Combinations of any and all of these processes may be possible, depending on the number and nature of the layers desired in final separator 40.

Method of Forming a Battery

Figure 9A:
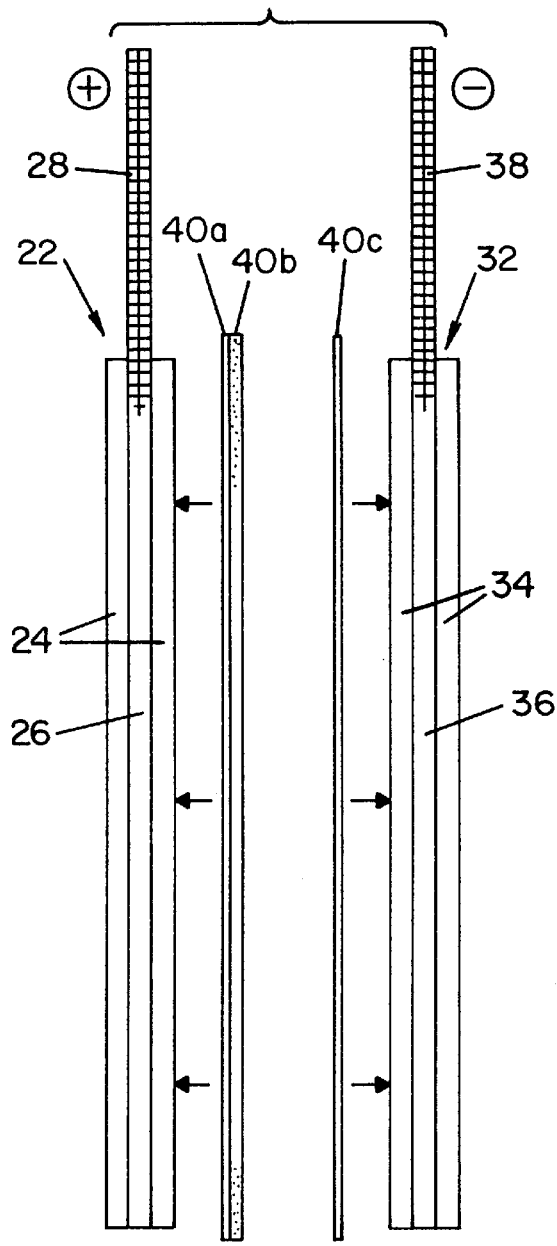
FIGS. 9A and 9B are schematic views showing a preferred method of forming a battery cell having a multi-layered separator, in accordance with one aspect of the present invention.
Figure 9B:
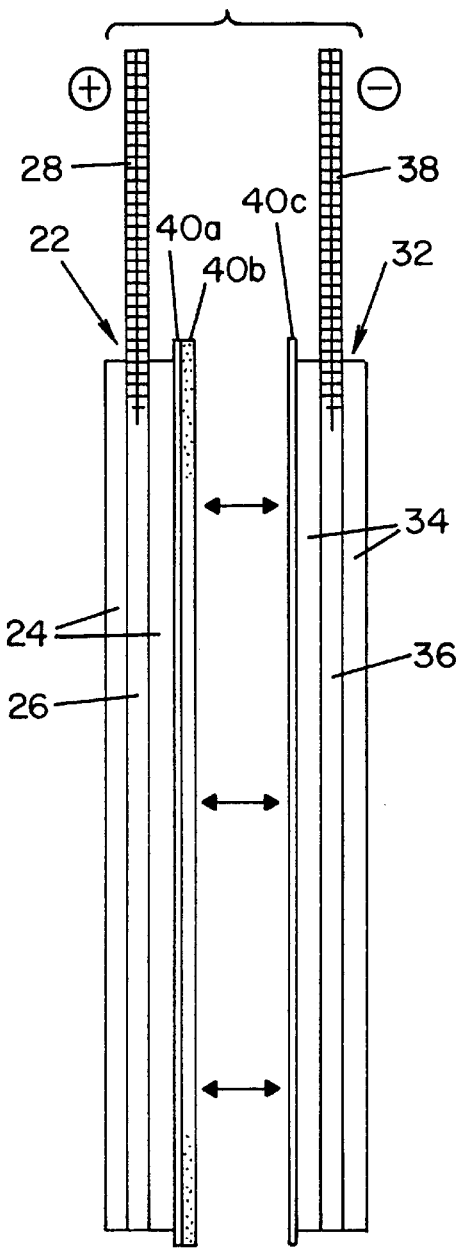

A multi-layered separator 40, made in accordance with the present invention, may be formed as a separate component, wherein separator layers 40a, 40b and 40c are individually formed and then joined into multi-layered separator 40 that is then laminated to cathode section 22 and anode section 32. In accordance with a preferred method of forming a battery 10, separator layers 40a and 40c are preferably first adhered, separately, to cathode film layer 24 and anode film layer 34, respectively, prior to their joining with intermediate separator layer 40b. In this respect, FIG. 9 schematically illustrates a preferred method of forming separator 40.

In accordance with a preferred method of forming a battery, it is preferable that the softer, less porous outer separator layers 40a, 40c are first laminated to their respective cathode film layer 24 and anode film layer 34 and then cathode section 22 with separator layer 40a thereon and anode section 32 with separator layer 40c thereon are then laminated together with intermediate separator layer 40b disposed between separator layers 40a and 40c. It will, of course, be appreciated by those skilled in the art that since cathode film layer 24 is relatively smooth, separator layer 40a and separator layer 40b may be applied simultaneously to cathode film 24 of cathode section 22 with satisfactory results.

More specifically, separator layer 40a is first joined to cathode section 22 by adhering separator layer 40a to cathode film 24. Similarly, separator layer 40c is preferably first adhered to anode film 34 of anode section 32. By laminating separator layer 40*c* directly to anode film layer 34 of anode section 32, more uniform laminating pressure may be exerted upon separator layer 40*c* since the surface applying the mechanical pressing (not shown) engages separator layer 40*c* directly and thus the laminating pressure is not dissipated by any intermediate layer that may be disposed between the mechanical surface and separator layer 40*c*. This facilitates better adhesion of separator layer 40*c* to the relatively rougher surface of anode film layer 34. Since separator layer 40*c* has a similar composition to separator layer 40*b*, laminating these layers to each other in a subsequent step still provides good adhesion to form the multi-layered separator layer 40.

The foregoing description of a preferred method of forming multi-layered separator 40 shows how the respective layers may be applied to cathode section 22 and anode section 32 based upon the surface conditions and adhesion characteristics of the respective film layers and separator layers. In accordance with the preferred method of the present invention, multi-layered separator 40 is preferably formed by first adhering one or more of the separator layers to a cathode film layer 24 of cathode section 22 and to an anode film layer 34 of anode section 32 and then subsequently joining the respective separator layers together to form the multi-layered separator 40.

Figure 10:
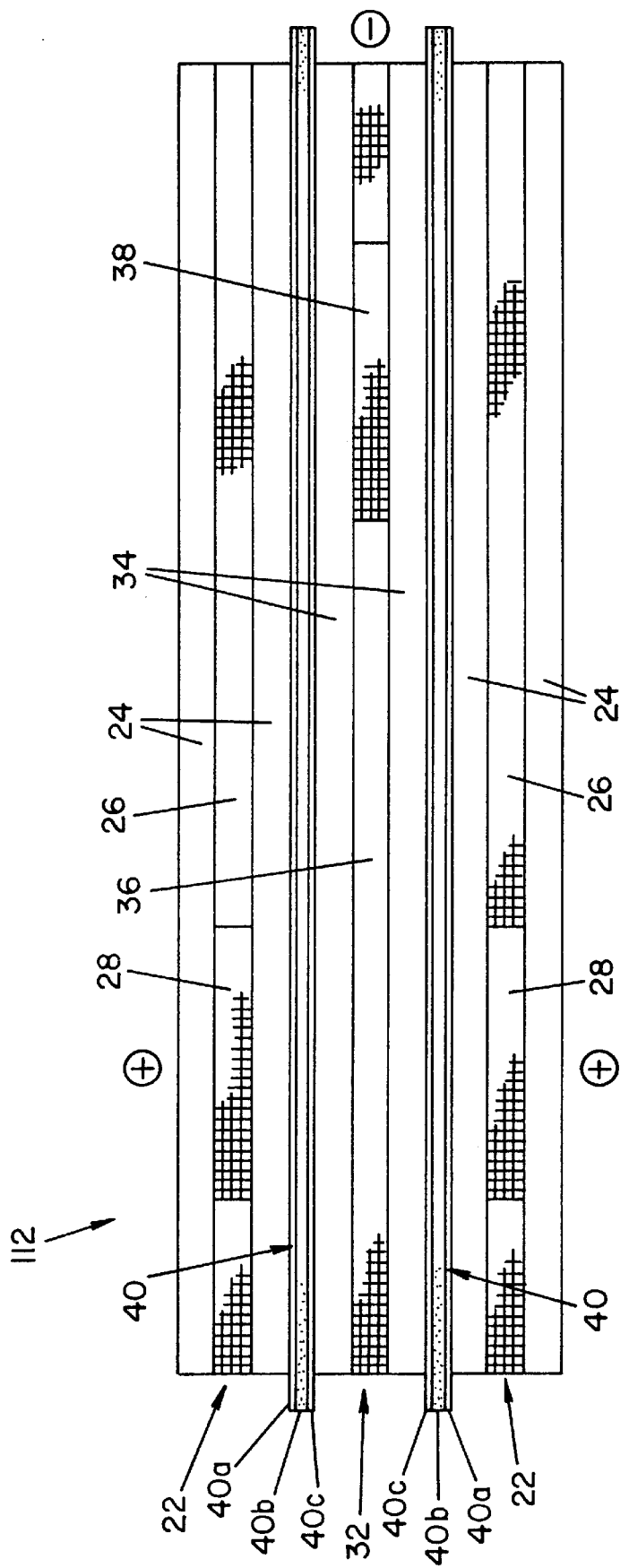
FIG. 10 is a bi-cell having two multi-layered separators illustrating another embodiment of the present invention.

Referring now to FIG. 10, a bi-cell 112 illustrating an alternate embodiment of the present invention is shown. As contrasted with cell 112 illustrated in FIGS. 1- 9, bi-cell 112 has two cathode sections 22 and an anode section 32 disposed therebetween. Cathode sections 22 and anode sections 32 are similar to those heretofore described, and like reference numbers are used to identify like components. Disposed between each cathode section 22 and anode section 32 is a multi-layered separator 40 similar to that heretofore described. FIG. 10 thus illustrates how a multi-layered separator 40 in accordance with the present invention finds advantageous application in multi-cell configurations.

The present invention thus provides a multi-layered battery separator for a lithium-ion and/or lithium-ion polymer battery, fuel cells and electrochemical cells. The present invention provides a means of increasing the range of requirements that can be met by combining separator layers that have different structural and physical properties. In a final battery construction, separator layer 40 will be a monolithic laminate (itself incorporated into the monolithic structure of the whole battery) comprising separator layers 40*a*, 40*b*, 40*c* etc. of different composition and hence properties. By associating different properties with different separator layers 40*a*, 40*b*, 40*c* in separator 40, the present invention advantageously separates the requirements and reduces the compromises that are usually necessary if a single separator composition is used. Because different materials and compositions can all be incorporated into a final, single separator construction, the range of properties that can be provided is increased. It is believed that separator 40, in accordance with the present invention, can translate into less expensive material or manufacturing costs, easier manufacturing processes, higher yields, better battery performance, greater abuse resistance of the battery and an enhanced range of operating conditions.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A Li-ion and/or Li-ion polymer cell, comprised of:
   a cathode section;
   an anode section; and
   a multi-layered separator disposed between said anode section and said cathode section, said separator including two outer separator layers and an intermediate separator layer disposed between said outer separator layers, each of said separator layers being comprised of a polymer, a filler and a plasticizer with said polymer, filler and plasticizer being the same for each of said separator layers, but with a weight percentage composition of said polymer, filler and plasticizer for said intermediate separator layer being different from a weight percentage composition of said outer separator layers, wherein said outer separator layers have a porosity different from said intermediate separate layer.

2. A Li-ion and/or Li-ion polymer cell as defined in claim 1, wherein said polymer is polyvinylidene fluoride, said filler is silica and said plasticizer is dibutyl phthalate.

3. A method of forming a Li-ion or Li-ion polymer battery having a multi-layered separator, comprising the steps of:
   a) forming an anode section and a cathode section, said anode section having an anode layer adhered to an anode current collector layer and said cathode section having a cathode layer applied to a cathode current collector;
   b) laminating a first separator layer formed of a first separator material to said anode layer of said anode section and laminating a second separator layer formed of a second separator material to said cathode layer of said cathode section, said second separator material being the same as said first separator material;
   c) laminating said anode section to said cathode section wherein said first separator layer and said second separator layer are disposed between said anode section and said cathode section and a third separator layer is disposed between said first separator layer and said second separator layer, each of said first, second and third separator layers being comprised of a polymer, a filler and a plasticizer with said polymer, filler and plasticizer being the same for each of said first, second and third separator layer, but with said third separator layer having a weight percentage composition different from a weight percentage composition of said first and second separator layers, wherein said first and second separator layers have a porosity different from said third separator layer.

4. A multi-layered separator for a Li-ion polymer battery, comprised of:
   two, outer separator layers and an intermediate separator layer disposed between said outer separator layers, each of said separator layers being comprised of a polymer, a filler and a plasticizer with said polymer, filler and plasticizer being the same for each of said separator layers, but with a weight percentage composition of said polymer, filler and plasticizer for said intermediate separator layer being different from a weight composition of said outer separator layers, wherein said outer separator layers have a porosity different from said intermediate separator layer.

5. A multi-layered separator as defined in claim 4, wherein said outer separator layers are more adhesive than said intermediate separator layer.

6. A multi-layered separator as defined in claim 4, wherein said polymer is polyvinylidene fluoride, said filler is silica and said plasticizer is dibutyl phthalate.

7. A multi-layered separator as defined in claim 4, wherein said outer separator layers are formed from the following:

about 33.4% by weight polyvinylidene fluoride, about 44.4% by weight dibutyl phthalate and about 22.2% by weight silica powder, and said intermediate separator layer is comprised of the following:

about 30% by weight polyvinylidene fluoride, about 35% by weight dibutyl phthalate and about 35% by weight silica powder.

8. A multi-layered separator for a Li-ion polymer battery as defined in claim 4, wherein said polymer is polyvinylidene fluoride, said filler is silica and said plasticizer is dibutyl phthalate.

* * * * *